United States Patent
Fujii et al.

(10) Patent No.: US 10,476,102 B2
(45) Date of Patent: Nov. 12, 2019

(54) BATTERY

(71) Applicant: Panasonic Intellectual Property Management Co., Ltd., Osaka (JP)

(72) Inventors: Takeshi Fujii, Osaka (JP); Koji Sakai, Hyogo (JP); Kazushi Yoshida, Osaka (JP); Yoshiya Sakaguchi, Kyoto (JP); Yuuichi Abe, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 39 days.

(21) Appl. No.: 15/522,325

(22) PCT Filed: Dec. 9, 2015

(86) PCT No.: PCT/JP2015/006126
§ 371 (c)(1),
(2) Date: Apr. 27, 2017

(87) PCT Pub. No.: WO2016/092839
PCT Pub. Date: Jun. 16, 2016

(65) Prior Publication Data
US 2017/0324110 A1    Nov. 9, 2017

(30) Foreign Application Priority Data
Dec. 10, 2014    (JP) .................. 2014-250072

(51) Int. Cl.
*H01M 10/0525*    (2010.01)
*H01M 10/48*    (2006.01)
(Continued)

(52) U.S. Cl.
CPC ........ *H01M 10/0525* (2013.01); *H01G 11/08* (2013.01); *H01G 11/32* (2013.01);
(Continued)

(58) Field of Classification Search
None
See application file for complete search history.

(56) References Cited

U.S. PATENT DOCUMENTS

2006/0261304 A1* 11/2006 Muthukumaran ........................ H01M 8/04007
252/62
2010/0075210 A1* 3/2010 Lee ...................... H01M 4/587
429/94
(Continued)

FOREIGN PATENT DOCUMENTS

| JP | 2003-059484 | 2/2003 |
| JP | 2007-123016 | 5/2007 |
| JP | 2012-018915 | 1/2012 |
| JP | 2012-531008 | 12/2012 |
| JP | 2013-171647 | 9/2013 |

OTHER PUBLICATIONS

Inoue et al. (JP, 2013-171647) (a raw machine translation) (Abstract) (Sep. 2, 2013) (Year: 2013).*
(Continued)

*Primary Examiner* — Carmen V Lyles-Irving
(74) *Attorney, Agent, or Firm* — McDermott Will & Emery LLP

(57) ABSTRACT

A battery includes a case, at least one of a first battery cell and a second battery cell disposed in the case, and a graphite sheet disposed at at least one of a position between the case and the first battery cell and a position between the first battery cell and the second battery cell. The graphite sheet has a terminal portion for taking out an electrical signal.

15 Claims, 8 Drawing Sheets

(51) Int. Cl.
  *H01M 10/617* (2014.01)
  *H01M 10/613* (2014.01)
  *H01G 11/32* (2013.01)
  *H01G 17/00* (2006.01)
  *H01M 4/133* (2010.01)
  *H01G 11/08* (2013.01)
  *H01M 10/0585* (2010.01)
  *H01M 10/6551* (2014.01)

(52) U.S. Cl.
  CPC ............ *H01G 17/00* (2013.01); *H01M 4/133* (2013.01); *H01M 10/0585* (2013.01); *H01M 10/48* (2013.01); *H01M 10/613* (2015.04); *H01M 10/617* (2015.04); *H01M 10/6551* (2015.04); *Y02E 60/13* (2013.01)

(56) References Cited

U.S. PATENT DOCUMENTS

2010/0279152 A1　11/2010　Payne
2012/0009455 A1　1/2012　Yoon

OTHER PUBLICATIONS

Inoue et al. (JP, 2013-171647) (a raw machine translation) (Detailed Description) (Sep. 2, 2013) (Year: 2013).*
Inoue et al. (JP, 2013-171647) (a raw machine translation) (Drawings) (Sep. 2, 2013) (Year: 2013).*
International Search Report of PCT application No. PCT/JP2015/006126 dated Mar. 8, 2016.

* cited by examiner

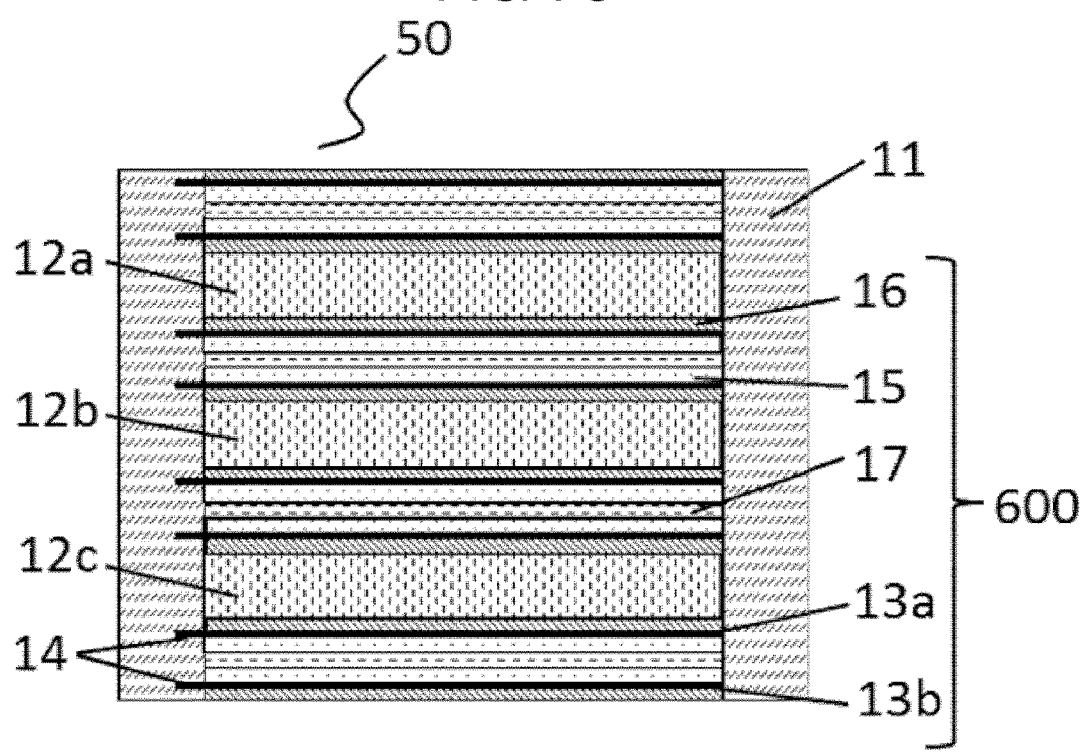

BATTERY

This application is a U.S. national stage application of the PCT international application No. PCT/JP2015/006126 filed on Dec. 9, 2015, which claims the benefit of foreign priority of Japanese patent application No. 2014-250072 filed on Dec. 10, 2014, the contents all of which are incorporated herein by reference.

TECHNICAL FIELD

The present disclosure relates to a battery, such as a lithium secondary battery, used in various electronic apparatuses or in vehicles.

BACKGROUND ART

A laminated secondary battery, such as a lithium ion secondary battery, includes a laminated body in which positive and negative electrode plates are alternately laminated, a cell case that accommodates the laminated body therein, an electrolyte solution that fills an inside of the cell case.

Such a secondary battery is generally used as an assembled battery in which plural battery cells are accommodated in a single battery case. When used as a battery, if a temperature differential among the battery cells becomes large, a battery cell with a relatively higher temperature is charged, discharged, and deteriorates faster than a battery cell with a relatively low temperature. In addition, upon deteriorating, the battery cells may expand. The expansion of the battery cell can be sensed with a strain gage to the battery call.

The technique for sensing the expansion of a battery with the strain gage attached to a battery is disclosed in PTL 1.

CITATION LIST

Patent Literature

PTL 1: Japanese Patent Laid-Open Publication No. 2003-059484

SUMMARY

The technique disclosed in PTL 1 has problems that the battery has a large size and it being likely that deterioration will occur if the battery has a high temperature.

A battery according to the present disclosure includes a case, at least one of a first battery cell and a second battery cell disposed in the case, and a graphite sheet disposed at at least one of a position between the case and the first battery cell and a position between the first battery cell and the second battery cell. The graphite sheet includes a terminal portion for taking out an electrical signal.

The battery solves the above problems, and allows detect expansion of the battery cells to be detected while the temperatures of the battery cells are equalized.

BRIEF DESCRIPTION OF DRAWINGS

FIG. 7C is a cross-sectional view of another battery in accordance with Embodiment 3.

DETAIL DESCRIPTION OF PREFERRED EMBODIMENTS

A battery that solves the above-mentioned problems will be described below with reference to drawings.

Exemplary embodiments described below show specific examples. The numerical values, shapes, materials, constituent elements, disposition positions of the constituent elements, connection modes, and the like, shown in the following exemplary embodiments are examples, and are not intended to limit the present invention. In addition, among the constituent elements in the following exemplary embodiments, constituent elements that are not disclosed in the independent claim that shows the primary concept are described as arbitrary constituent elements. In the following description, the same reference symbols are given to like and equivalent components throughout all of the drawings, and overlapping description thereof is omitted.

Exemplary Embodiment 1

A battery in accordance with Exemplary Embodiment 1 will be described below with reference to drawings.

Figure 1:
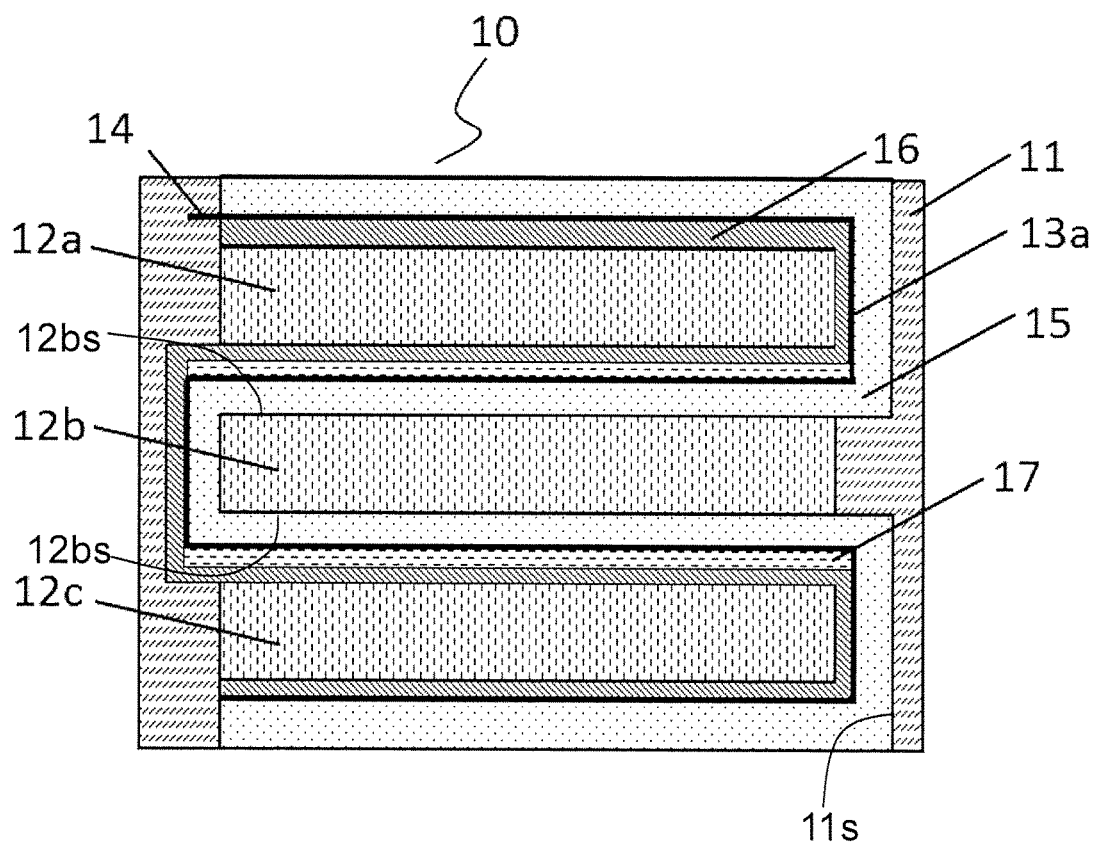
FIG. 1 is a cross-sectional view of a battery in accordance with Exemplary Embodiment 1.
Figure 2A:
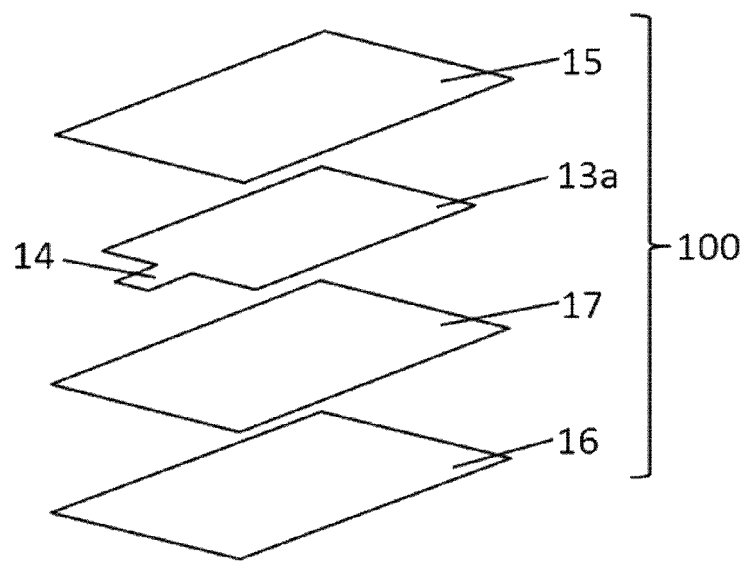
FIG. 2A is an exploded perspective view of a capacitor portion in accordance with Embodiment 1.

FIG. 1 is a cross-sectional view of battery 10 in accordance with Embodiment 1. FIG. 2A is an exploded perspective view of capacitor portion 100 in case 11 of battery 10.

Battery 10 shown in FIG. 1 is a lithium ion secondary battery. Battery 10 includes case 11 made of metal, three battery cells 12a, 12b, and 12c disposed in case 11, and capacitor portion 100. Capacitor portion 100 extends through a space between each pair of battery cells out of battery cells 12a to 12c.

As shown in FIG. 2A, capacitor portion 100 includes graphite sheet 13a, thermal insulation sheet 17 on a lower surface of graphite sheet 13a, and dielectric layer 15 on an upper surface of graphite sheet 13a. Graphite sheet 13a includes terminal portion 14 provided at an end thereof for detecting an electrical signal. Capacitor portion 100 further includes insulation layer 16 on a lower surface of thermal insulation sheet 17.

The capacitor portion described in the present disclosure is a constituent element that includes at least a graphite sheet and that is disposed between plural battery cells and between a battery cell and a case, but the constituent elements are not limited thereto.

Graphite sheet 13a is a conductor that can be used as an electrode. Graphite sheet 13a is a pyrolytic graphite sheet obtained by pyrolytically decomposing a polymer, and has a thickness of about 25 μm. Graphite sheet 13a has a larger flexibility than a graphite sheet obtained by packing pieces of graphite, accordingly being easily disposed between the battery cells. The thermal conductivity of the pyrolytic graphite sheet is about 1200 W/m·K, and is significantly higher than the thermal conductivity of copper, which is widely used as an electrode. The pyrolytic graphite sheet is useful particularly as a heat dissipating member used in a narrow space.

Terminal portion 14 of graphite sheet 13a shown in FIG. 2A is an end portion of graphite sheet 13a locally projecting. Terminal portion 14 of graphite sheet 13a is a connection terminal for connecting an external terminal to graphite sheet 13a as an electrode. Terminal portion 14 that connects graphite sheet 13a to an external terminal may be made of a constituent material differing from graphite sheet 13a.

Dielectric layer 15 is made of urethane, and has a thickness of about 100 μm.

Insulation layer 16 is made of polyethylene terephthalate (PET), and has a thickness of about 10 μm.

In thermal insulation sheet 17, a silica xerogel is held between fibers of a fiber sheet of a non-woven fabric. The silica xerogel has a nano-size void structure that regulates the motion of air molecules, and has a small thermal conductivity. The thermal conductivity of thermal insulation sheet 17 containing silica xerogel ranges from about 0.018 to 0.024 W/m·K. Similarly to the pyrolytic graphite sheet, thermal insulation sheet 17 is useful particularly as a thermal insulation member used in a narrow space. Since the thermal conductivity of thermal insulation sheet 17 is lower than the thermal conductivity of air, the thermal insulation performance thereof is greater than a layer of air as a thermal insulation layer between battery cells. The thermal insulation sheet is thus useful in the case in which there is a concern of catching fire in battery cells, and contributes to reducing of the size of a battery as a result of being useful in an application in narrow spaces.

Each of thermal insulation sheets 17 shown in FIG. 1 is provided between respective one pair of battery cells of battery cells 12a, 12b, and 12c. However, similarly to capacitor portion 100, single thermal insulation sheet 17 may extend through spaces between each pair of battery cells out of battery cells 12a, 12b, and 12c.

Instead of metal, case 11 may be laminated with an aluminum metal layer.

In battery 10, graphite sheet 13a provided in capacitor portion 100 can reduce a temperature difference between battery cells 12a, 12b, and 12c due to transmitting of heat generated by battery cells 12a, 12b, and 12c. That is, graphite sheet 13a can equalize temperatures in insides of battery cells 12a, 12b, and 12c, and between battery cells 12a, 12b, and 12c.

A sensing of expansion of the battery cells disposed inside the case of the battery will be described below.

The volumes of the battery cells expands as due deterioration thereof. The expansion of the battery cells applies compression stress to members inside the case, and provides the members with distortion. The battery of the present disclosure senses the expansion of the battery cells by detecting a distortion of the members as a change in a capacitance value.

Figure 3:
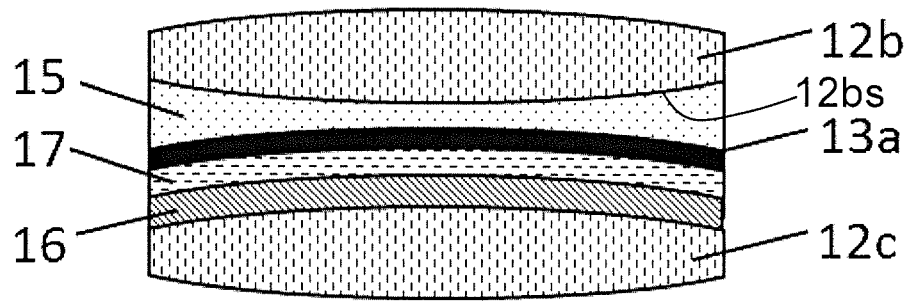
FIG. 3 is a cross-sectional view of a battery cell which expands in accordance with Embodiment 1.

FIG. 3 is a cross-sectional view of capacitor portion 100 when battery cells 12b and 12c expand. As shown in FIG. 3, when battery cells 12b and 12c deteriorate and have volumes expand, compression stress is applied to capacitor portion 100, hence providing capacitor portion 100 with distortion. Battery 10 can detect a change in the capacitance value of capacitor portion 100 generated due to the distortion of capacitor portion 100.

The capacitance value is detected by converting, into an electrical signal, the capacitance value of dielectric layer 15 which is disposed between electrodes, i.e., graphite sheet 13a and battery cell 12b. A surface 12bs of a package of battery cell 12b is used as an electrode, and is made of a conductor, such as a metal. Each of insulation layers 16 is provided respective one pair of battery cells out of battery cells 12a, 12b, and 12c, and electrically insulates respective one space between respective one pair of battery cells of battery cells 12a, 12b, and 12c.

Similarly, the capacitance value may be detected by converting, into an electrical signal, the capacitance value of dielectric layer 15 disposed between a pair of electrodes, i.e., graphite sheet 13a and case 11. An inner surface 11s of case 11, which is used as an electrode, is made of conductive material, such as a metal.

The pyrolytic graphite sheet has a higher thermal conductivity and a lower linear expansion coefficient than a metal, such as copper, that is generally used as an electrode. An influence of a temperature to a change in the capacitance value can be reduced since a change in a physical property value, such as electric conductivity, due to temperature is small. Therefore, the pyrolytic graphite sheet allows the expansion of the battery cells to be sensed more accurately than copper.

The relative dielectric constant of the material of dielectric layer 15 is preferably not smaller than three. The relative dielectric constant of dielectric layer 15 not smaller than three increases the capacitance value between the pair of electrodes, accordingly allowing the expansion of the battery cells to be sensed accurately even for a small amount of distortion.

The Young's modulus of the material of insulation layer 16 is preferably larger than the Young's modulus of the material of dielectric layer 15. The material of insulation layer 16 preferably has a larger Young's modulus than the material of dielectric layer 15. This configuration allows the amount of distortion of dielectric layer 15 due to compression stress to be larger than that of insulation layer 16, hence increasing the amount of change in the capacitance value. Therefore, the expansion of the battery cells can be sensed accurately. The Young's modulus of insulation layer 16 is preferably not smaller than 2 GPa to detect the expansion of the battery cells accurately.

A modification of battery 10 in accordance with Embodiment 1 will be described below.

Figure 2B:
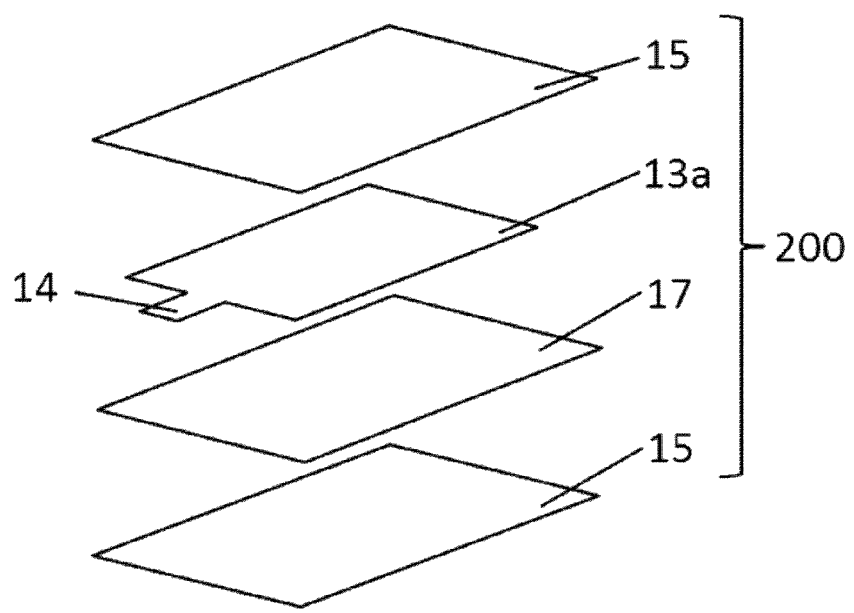
FIG. 2B is an exploded perspective view of a capacitor portion in accordance with Embodiment 1.

FIG. 2B shows capacitor portion 200 having a different configuration to that of capacitor portion 100 shown in FIG. 2A. Capacitor portion 200 shown in FIG. 2B includes graphite sheet 13a, thermal insulation sheet 17 on a lower surface of graphite sheet 13a, dielectric layer 15 an upper surface of graphite sheet 13a, and dielectric layers 15 on a lower surface of thermal insulation sheet 17. Graphite sheet 13a includes terminal portion 14 at an end thereof for taking out an electrical signal. Capacitor portion 200 shown in of FIG. 2B including dielectric layers both above and below graphite sheet 13a constitutes two pairs of electrodes commonly sharing graphite sheet 13a as a common electrode. That is, one electrode of each of the two pairs of the electrodes is graphite sheet 13a while another electrode of each of the two pairs of the electrodes is one selected from battery cell 12b, battery cell 12c, and case 11. This configuration also allows capacitance values of two dielectric layers 15 to be detected as electrical signals, and allows the expansion of the battery cells to be sensed accurately.

Exemplary Embodiment 2

Battery 20 in accordance with Exemplary Embodiment 2 will be described below with reference to drawings.

Components identical to those of Embodiment 1 are denoted by the same reference numerals, and their description will be omitted.

Figure 4:
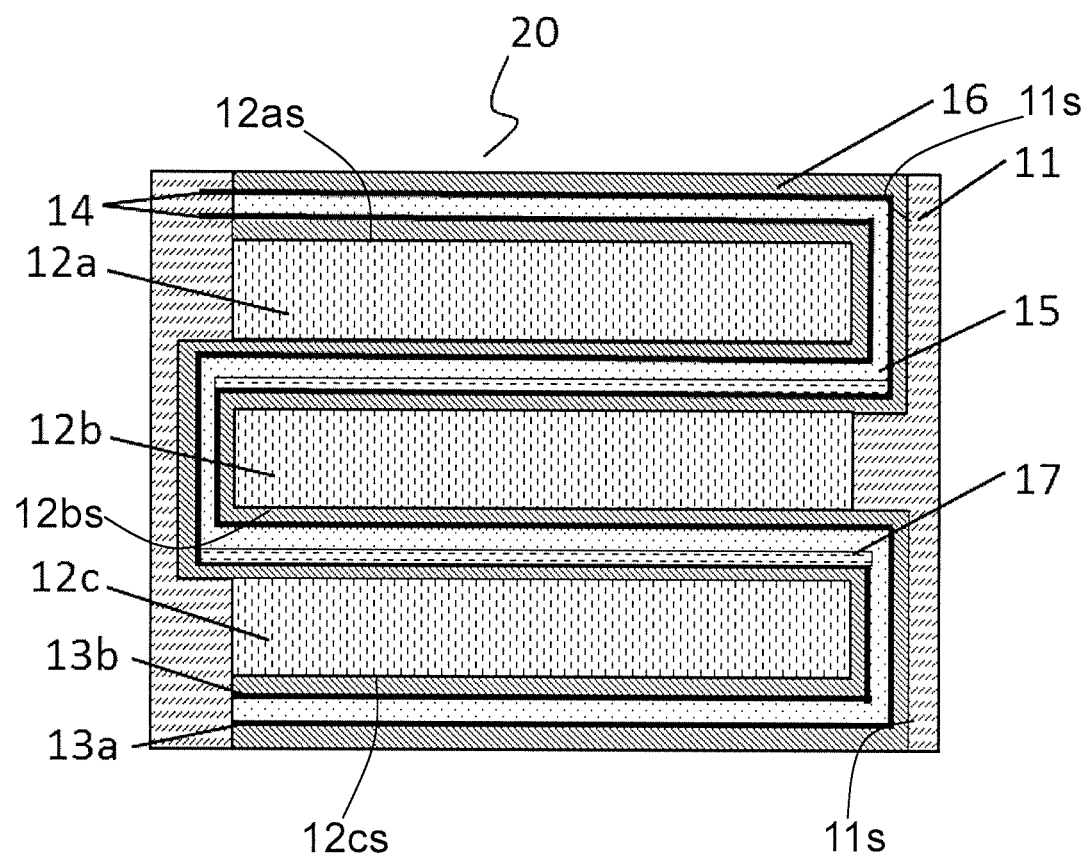
FIG. 4 is a cross-sectional view of a battery in accordance with Exemplary Embodiment 2.
Figure 5:
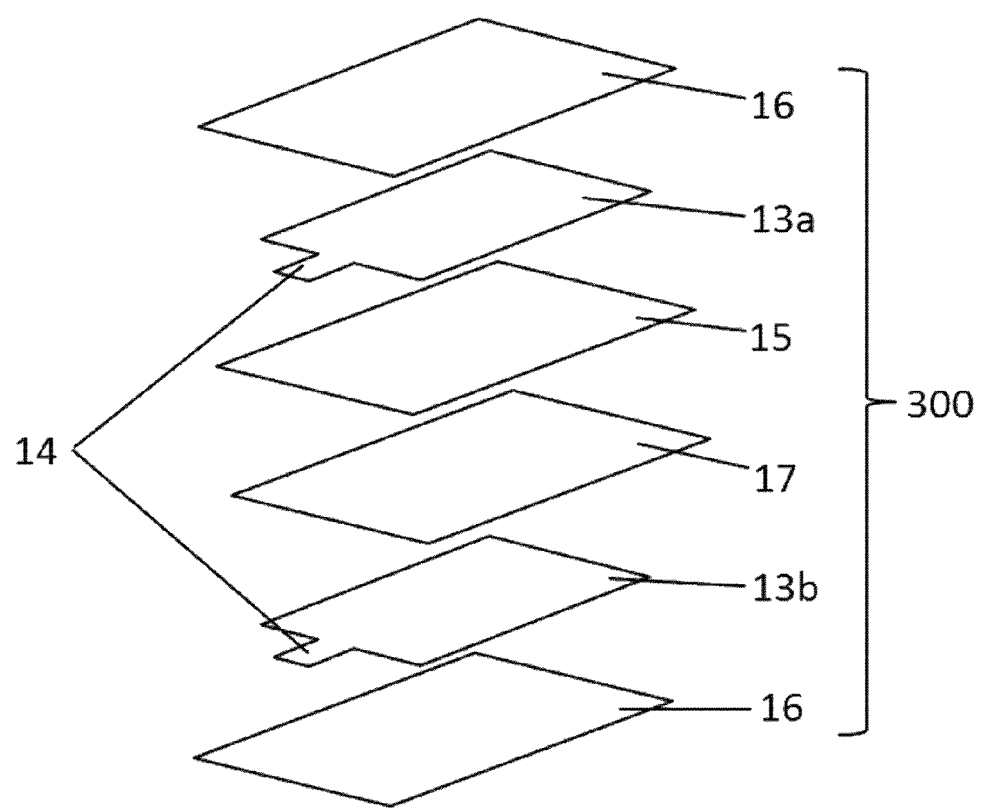
FIG. 5 is an exploded perspective view of a capacitor portion in accordance with Embodiment 2.

FIG. 4 is a cross-sectional view of battery 20 in accordance with Embodiment 2. FIG. 5 is an exploded perspective view of capacitor portion 300 in case 11 of battery 20.

Battery 20 differently from battery 10 in accordance with Embodiment 1 includes two graphite sheets 13a and 13b including terminal portions 14 provided at end portions thereof for taking out electrical signals.

Capacitor portion 300 includes graphite sheets 13a and 13b, dielectric layer 15, thermal insulation sheet 17, and two insulation layers 16. Dielectric layer 15 and thermal insulation sheet 17 are provided between graphite sheets 13a and 13b. Two insulation layers 16 are provided on surfaces of graphite sheets 13a and 13b opposite to the surfaces on which dielectric layer 15 is provided. Battery 20 including two graphite sheets 13a and 13b can transmit a more amount of heat than battery 10 in accordance with Embodiment 1, hence reducing the temperature difference among battery cells 12a, 12b, and 12c.

The sensing of an expansion of the battery cells disposed inside the case of the battery will be described below.

Figure 6:
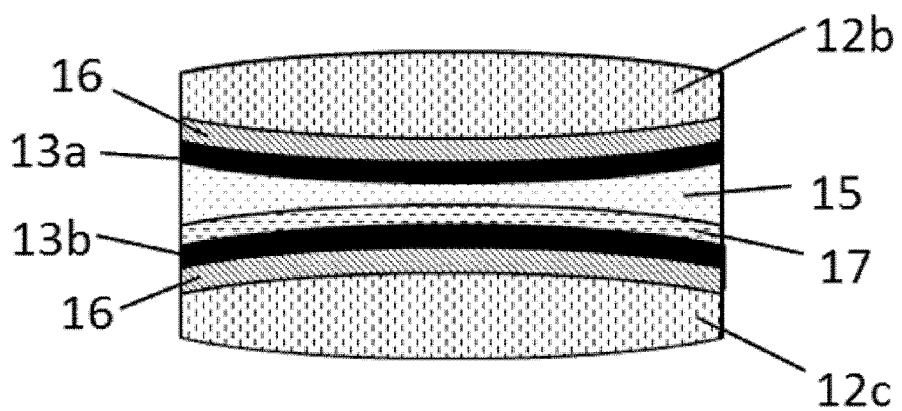
FIG. 6 is a cross-sectional view of a battery cell which expands in accordance with Embodiment 2.

FIG. 6 is a cross-sectional view of capacitor portion 300 when battery cell 12b and battery cell 12c expand. As shown in FIG. 6, when battery cells 12b and 12c deteriorate and the volumes thereof expand, compression stress is applied to capacitor portion 300 to provide capacitor portion 300 with distortion. Battery 20 can detect a change in the capacitance value of capacitor portion 300 generated due to the distortion of capacitor portion 300.

The capacitance value is detected by converting, into an electrical signal, the capacitance value of dielectric layer 15 disposed between the pair of electrodes, i.e., graphite sheets 13a and 13b as conductors.

One of the insulation layers is provided between battery cells 12a and 12b to electrically insulate the space between battery cells 12a and 12b while another one of the insulation layers is provided between battery cells 12b and 12c to electrically insulate the space between battery cells 12b and 12c.

Either one of graphite sheets 13a and 13b, conductors, is regarded as one electrode of a pair of electrodes while and one of battery cells 12a, 12b, and 12c, and case 11 is regarded as another electrode of the pair of the electrodes. The capacitance value of dielectric layer 15 disposed between the pair of electrodes can be detected by converting the capacitance value into an electrical signal. At this moment, one of surfaces 12as-12bs of outer packages of the battery cells 12a-12c and an inner surface 11s of case 11 which are used as the pair of electrodes are made of conductive material, such as metal.

Exemplary Embodiment 3

A battery in accordance with Exemplary Embodiment 3 will be described below with reference to drawings.

Components identical to those of Embodiments 1 and 2 are denoted by the same reference numeral, and their description will be omitted.

In battery 10 in accordance with Embodiment 1, single capacitor portion 100 is disposed and extends through the spaces between pairs of battery cells of battery cells 12a, 12b, and 12c, but the configuration of the capacitor portion is not limited to this configuration. A battery including plural capacitor portions between the battery cells will be described.

Figure 7A:
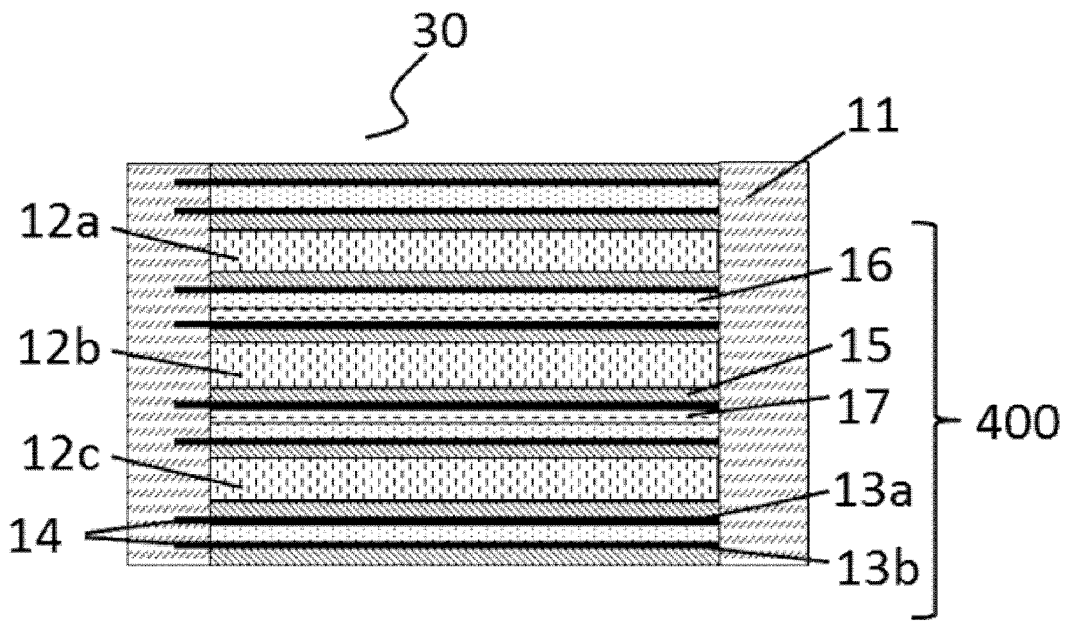
FIG. 7A is a cross-sectional view of a battery in accordance with Exemplary Embodiment 3.

FIG. 7A is a cross-sectional view of battery 30 in accordance with Embodiment 3.

Battery 30 is provided with a plurality of capacitor portions 400 respectively in the spaces between battery cell 12a, battery cell 12b, and battery cell 12c, and the plurality of capacitor portions 400 are respectively pasted onto battery cell 12a, battery cell 12b, and battery cell 12c.

Capacitor portions 400 include graphite sheet 13a, graphite sheet 13b, a dielectric layer, and a thermal insulation sheet. The dielectric layer and the thermal insulation sheet are provided between graphite sheet 13a and graphite sheet 13b. In battery 30, when one of battery cells 12a, 12b, and 12c deteriorates and expands, the capacitance value of dielectric layer 15 disposed between a pair of electrodes, i.e., graphite sheets 13a and 13b is detected by converting the capacitance value into an electrical signal.

Figure 7B:
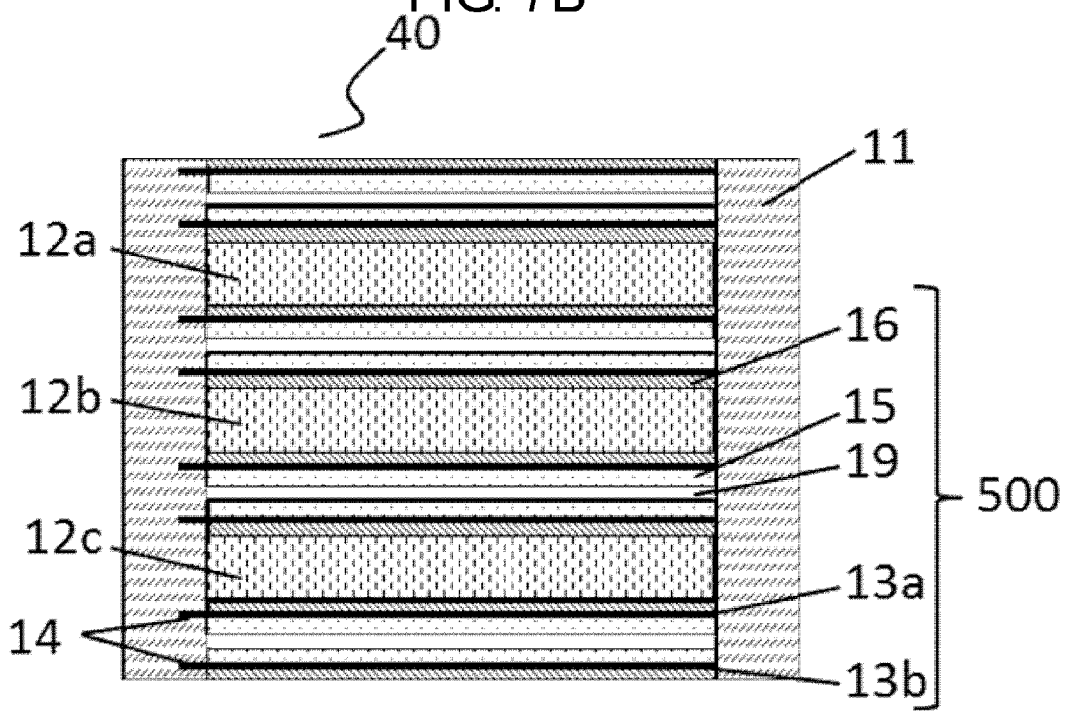
FIG. 7B is a cross-sectional view of another battery in accordance with Embodiment 3.

FIG. 7B is a modification of the battery in accordance with Embodiment 3.

Battery 40 includes plural capacitor portions 500 provided in the spaces between battery cells 12a, 12b, and 12c. Each of capacitor portions 500 are attached onto respective one of battery cells 12a, 12b, and 12c.

Each capacitor portion 500 includes graphite sheets 13a and 13b, two dielectric layers 15 between graphite sheets 13a and 13b, and space 19 between two dielectric layers 15. Spaces 19 provided in capacitor portions 500, battery 40 can discriminate whether the amount of expansion of the battery cells is small or large, and can exclusively sense only the case that the amount of expansion of the battery cells is large.

For example, in a battery having no space 19 provided in capacitor portions 500, dielectric layers 15 are distorted even in a case that a small expansion of the battery cells occurs due to ordinary charging and discharging of the battery, hence changing the capacitance value of dielectric layer 15. Meanwhile, in battery 40 in which spaces 19 are provided in capacitor portions 500, spaces 19 are crushed preferentially by the compression stress arising from a small expansion of the battery cells. Therefore, the capacitance value of dielectric layers 15 does not change since the compression stress is not applied to dielectric layers 15. That is, battery 40 can detect the capacitance value by discriminating between a case that the expansion of the battery cells is small and a case that a rapid expansion of the cells caused by gas generated due to overcharging of the battery.

FIG. 7C is another modification the battery in accordance with Embodiment 3. In each of plural capacitor portions 600 of battery 50, thermal insulation sheet 17 is provided in space 19. Thermal insulation sheet 17 is provided in the space between battery cells 12a and 12b while another thermal insulation sheet 17 is provided in the space between battery cells 12b and 12c. This configuration is useful in a case that fire may extend in the spaces between battery cells 12a, 12b, and 12c, hence contributing to reducing of the size of the battery. The thermal conductivity of thermal insulation sheets 17 is lower than that of spaces 19 composed of air. Therefore, thermal insulation sheets 17 are preferable as thermal insulation members.

INDUSTRIAL APPLICABILITY

A battery according to the present disclosure reduces deterioration of a battery cell, and in addition to obtaining a compact battery, can provide a safe battery by sensing expansion of a battery cell, and therefore, is industrially applicable.

REFERENCE MARKS IN THE DRAWINGS 10 battery
11 case
12a battery cell
12b battery cell
12c battery cell
13a graphite sheet
13b graphite sheet
14 terminal portion
15 dielectric layer
16 insulation layer
17 thermal insulation sheet
19 space
20 battery
30 battery
40 battery
50 battery
600 capacitor portion
100 capacitor portion
200 capacitor portion
300 capacitor portion
400 capacitor portion
500 capacitor portion

The invention claimed is:

1. A battery comprising:
a case;
a first battery cell disposed in the case; and
a capacitor portion disposed between the case and the first battery cell,
wherein the capacitor portion includes:
a graphite sheet disposed between the case and the first battery cell; and
a dielectric layer disposed between the graphite sheet and the case;
wherein the case includes a conductive inner surface facing the dielectric layer, and
wherein the graphite sheet includes a terminal portion which outputs an electrical signal that indicates a capacitance between the conductive inner surface and the graphite sheet.

2. The battery of claim 1, the capacitor portion further includes an insulation layer which is disposed between the first battery cell and the graphite sheet.

3. A battery comprising:
a case;
a first battery cell disposed in the case; and
a capacitor portion disposed between the case and the first battery cell,
wherein the capacitor portion includes:
a first graphite sheet which is disposed between the first battery cell and the case;
a dielectric layer disposed between the first graphite sheet and the case; and
a second graphite sheet which is disposed between the dielectric layer and the case,
wherein the first graphite sheet includes a first terminal portion and the second graphite sheet includes a second terminal portion, and
wherein the first terminal portion and the second terminal portion output electrical signals that indicate a capacitance between the first graphite sheet and the second graphite sheet.

4. A battery comprising:
a first battery cell;
a second battery cell facing the first battery cell; and
a capacitor portion disposed between the first battery cell and the second battery cell,
wherein the capacitor portion includes:
a graphite sheet disposed between the first battery cell and the second battery cell; and
a dielectric layer disposed between the graphite sheet and the second battery cell,
wherein the second battery cell includes a conductive surface facing the dielectric layer, and
wherein the graphite sheet includes a terminal portion which outputs an electrical signal that indicates a capacitance between the conductive surface and the graphite sheet.

5. The battery of claim 1, the battery further comprising:
a second battery cell facing the first battery cell,
wherein the capacitor portion is further disposed between the first battery cell and the second battery cell,
wherein the graphite sheet is further disposed between the first battery cell and the second battery cell,
wherein the dielectric layer is further disposed between the graphite sheet and the second battery cell,
wherein the second battery cell includes a conductive surface facing the dielectric layer, and
wherein the electrical signal indicates a capacitance between the conductive surface and the graphite sheet and the capacitance between the conductive inner surface and the graphite sheet.

6. The battery of claim 5, wherein the capacitor portion further includes an insulation layer between the graphite sheet and the first battery cell.

7. The battery of claim 6, wherein the capacitor portion further includes a thermal insulation sheet between the graphite sheet and the insulation layer, and between the second battery cell and the first battery cell.

8. The battery of claim 4, wherein the capacitor portion further includes an insulation layer between the graphite sheet and the first battery cell.

9. The battery of claim 4, wherein the capacitor portion further includes a thermal insulation sheet between the graphite sheet and the insulation layer, and between the second battery cell and the first battery cell.

10. A battery comprising:
a first battery cell;
a second battery cell facing the first battery cell; and
a capacitor portion disposed between the first battery cell and the second battery cell,
wherein the capacitor portion includes:
a first graphite sheet disposed between the first battery cell and the second battery cell;
a dielectric layer disposed between the first graphite sheet and the first battery cell: and
a second graphite sheet disposed between the dielectric layer and the first battery cell,
wherein the first graphite sheet includes a first terminal portion, and the second graphite sheet includes a second terminal portion, and
wherein the first terminal portion and the second terminal portion output electrical signals that indicate a capacitance between the first graphite sheet and the second graphite sheet.

11. The battery of claim 7, wherein a Young's modulus of the dielectric layer is lower than a Young's modulus of the insulation layer.

12. The battery of claim 9, wherein a Young's modulus of the dielectric layer is lower than a Young's modulus of the insulation layer.

13. The battery of claim 10, wherein the capacitor portion further includes an insulation layer between the first graphite sheet and the first battery cell.

14. The battery of claim 13, wherein the capacitor portion further includes a thermal insulation sheet between the first graphite sheet and the insulation layer, and between the second battery cell and the first battery cell.

15. The battery of claim 13, wherein a Young's modulus of the dielectric layer is lower than a Young's modulus of the insulation layer.

* * * * *